(12) United States Patent
Bae et al.

(10) Patent No.: US 11,440,640 B2
(45) Date of Patent: Sep. 13, 2022

(54) BI-DIRECTIONAL NO-BACK BRAKE PROGRESSIVE MODULATION SPRING SYSTEMS AND METHODS

(71) Applicant: The Boeing Company, Chicago, IL (US)

(72) Inventors: Kwan-Ho Bae, Mukilteo, WA (US); Mark J. Gardner, Snohomish, WA (US); Jen-Shen Liu, Everett, WA (US)

(73) Assignee: The Boeing Company, Chicago, IL (US)

( * ) Notice: Subject to any disclaimer, the term of this patent is extended or adjusted under 35 U.S.C. 154(b) by 937 days.

(21) Appl. No.: 16/224,497

(22) Filed: Dec. 18, 2018

(65) Prior Publication Data

US 2020/0189723 A1 Jun. 18, 2020

(51) Int. Cl.
  *B64C 13/28* (2006.01)
  *B64C 13/32* (2006.01)
  *F16D 59/02* (2006.01)
  *F16D 65/02* (2006.01)
  *F16D 125/38* (2012.01)
  *F16H 35/00* (2006.01)

(52) U.S. Cl.
  CPC .............. *B64C 13/32* (2013.01); *F16D 59/02* (2013.01); *F16D 65/028* (2013.01); *F16D 2125/38* (2013.01); *F16H 2035/005* (2013.01)

(58) Field of Classification Search
  CPC ......... B64C 13/00; B64C 13/28; B64C 13/32; B64C 13/341; F16D 59/00; F16D 9/00; F16D 9/08; F16H 2035/005
  See application file for complete search history.

(56) References Cited

U.S. PATENT DOCUMENTS

| 4,850,458 A * | 7/1989 | Allan ..................... F16D 59/00 188/134 |
| 4,898,265 A * | 2/1990 | Metcalf ................. F16D 43/216 188/134 |
| 5,141,084 A * | 8/1992 | Lang ....................... B60T 1/062 188/71.4 |
| 6,231,012 B1 * | 5/2001 | Cacciola ............ B64D 45/0005 244/213 |

FOREIGN PATENT DOCUMENTS

EP 0983937 3/2000

* cited by examiner

*Primary Examiner* — Richard G Davis
(74) *Attorney, Agent, or Firm* — Haynes and Boone, LLP (57) ABSTRACT

Methods and systems according to one or more examples are provided for reducing chatter in a no-back brake during aiding load operations. In one example, an apparatus comprises a no-back brake, disposed within an actuator coupled to an aircraft, including a shaft, and a ball ramp plate, coupled to the shaft, to receive a force comprising an air loading force and is displaced responsive to the force. The apparatus further comprises a brake, coupled to the shaft and coupled to the ball ramp plate, and displaced by the ball ramp plate corresponding to a distance the ball ramp plate is displaced. The apparatus further comprises a modulating spring, coupled to the shaft and coupled to the brake, configured to compress in response to the brake being displaced, and the modulating spring is configured to apply a selective compressive force at the brake corresponding to a distance the brake is displaced.

18 Claims, 9 Drawing Sheets

BI-DIRECTIONAL NO-BACK BRAKE PROGRESSIVE MODULATION SPRING SYSTEMS AND METHODS

TECHNICAL FIELD

The present disclosure relates generally to actuator systems and more specifically to improved techniques for reducing chatter of a no-back brake.

BACKGROUND

No-back brakes are used in many actuator applications to provide protection from backdriving during high energy aiding loading operations. No-back brakes may be susceptible to chatter under such operating conditions. Excessive chatter may result in early wear-out that results in degraded performance, increased maintenance costs, and down-time.

Accordingly, there is a need for improved systems, apparatus, and related methods to efficiently and effectively reduce chatter in no-back brakes and to improve performance associated with no-back brakes.

SUMMARY

Methods and systems are disclosed herein that provide improved techniques for reducing chatter in a no-back brake. In some examples, a no-back brake is included in an actuator assembly used to drive a trailing edge flap of an aircraft. In various examples, a modulating spring is included in the no-back brake to provide for a progressive compressive force against a brake section within the no-back brake as the brake section is axially displaced during high energy aiding loading operations. The modulating spring is compressed by the axial displacement of the brake, and provides a compressive force against the brake section (e.g., damping) to mitigate chatter within the no-back brake.

In one example, an apparatus includes a no-back brake, disposed within an actuator coupled to an aircraft, comprising: a shaft; a ball ramp plate, coupled to the shaft, configured to receive a force comprising an air loading force and to be displaced responsive to the force; a brake, coupled to the shaft and coupled to the ball ramp plate, configured to be displaced, by the ball ramp plate, corresponding to a distance the ball ramp plate is displaced; and a modulating spring, coupled to the shaft and coupled to the brake, configured to compress in response to the brake being displaced, wherein the modulating spring is configured to apply a selective compressive force at the brake corresponding to a distance the brake is displaced.

In another example, a method includes receiving a force comprising an air load associated with a flap of an aircraft at a ball ramp plate of a no-back brake; displacing the ball ramp plate responsive to the force; displacing a brake, by the ball ramp plate, corresponding to a distance the ball ramp plate is displaced; compressing a modulating spring responsive to the brake being displaced; and applying a selective compressive force, by the modulating spring, at the brake corresponding to a distance the brake is displaced.

The scope of the disclosure is defined by the claims, which are incorporated into this section by reference. A more complete understanding of examples of the disclosure will be afforded to those skilled in the art, as well as a realization of additional advantages thereof, by a consideration of the following detailed description of one or more examples. Reference will be made to the appended sheets of drawings that will first be described briefly.

BRIEF DESCRIPTION OF THE DRAWINGS

Examples of the present disclosure and their advantages are best understood by referring to the detailed description that follows. It should be appreciated that like reference numerals are used to identify like elements illustrated in one or more of the figures.

DETAILED DESCRIPTION

No-back brakes are incorporated as part of an actuator assembly used in the deployment and retraction of leading and/or trailing edge flaps on an aircraft, for example. A power drive unit input applies a torque to a reaction plate and a ball ramp plate of the no-back brake to unlock the no-back brake and drive the trailing edge flap to a commanded position, against an opposing air load of the flap. Once the trailing edge flap reaches a commanded position and the input from the PDU is removed, no-back brake provides a resisting force that holds the trailing edge flap in position.

During aiding load operation where the PDU provides a torque to move the flap in the direction of the air load, a back drive air load (e.g., an aerodynamically induced load from action of the trailing edge flap, for example) applies an aiding load force to the ball ramp plate in the direction of the PDU torque. The back drive air load, through a camming action of the reaction plate and the ball ramp plate axially displaces the ball ramp plate, that in turn displaces a brake section and causes the brake section to slip in a jerking manner (e.g., brake stick slip). When the back drive air load is present at the ball ramp plate during aiding load operation, the modulating spring "progressively" compresses in response, and provides damping to mitigate the brake stick slip which could cause chatter in the no-back brake and/or oscillations in the drive system.

Various examples of the present disclosure provide for improved techniques for reducing chatter in a no-back brake. In some examples, a modulating spring is included within the no-back brake to provide a compressive force at the brake section when the brake section is displaced. Modulating spring may include at least two or more conically shaped springs to provide for a progressive compressive force in relation to displacement of the brake section. In some examples, the number of conically shaped springs used is determined based on the aiding load condition. For example, under high energy aiding load conditions, modulating spring may include two or more springs to reduce chatter. Thus, the modulating spring can be tuned to provide optimum damping for specific conditions.

Figure 1:
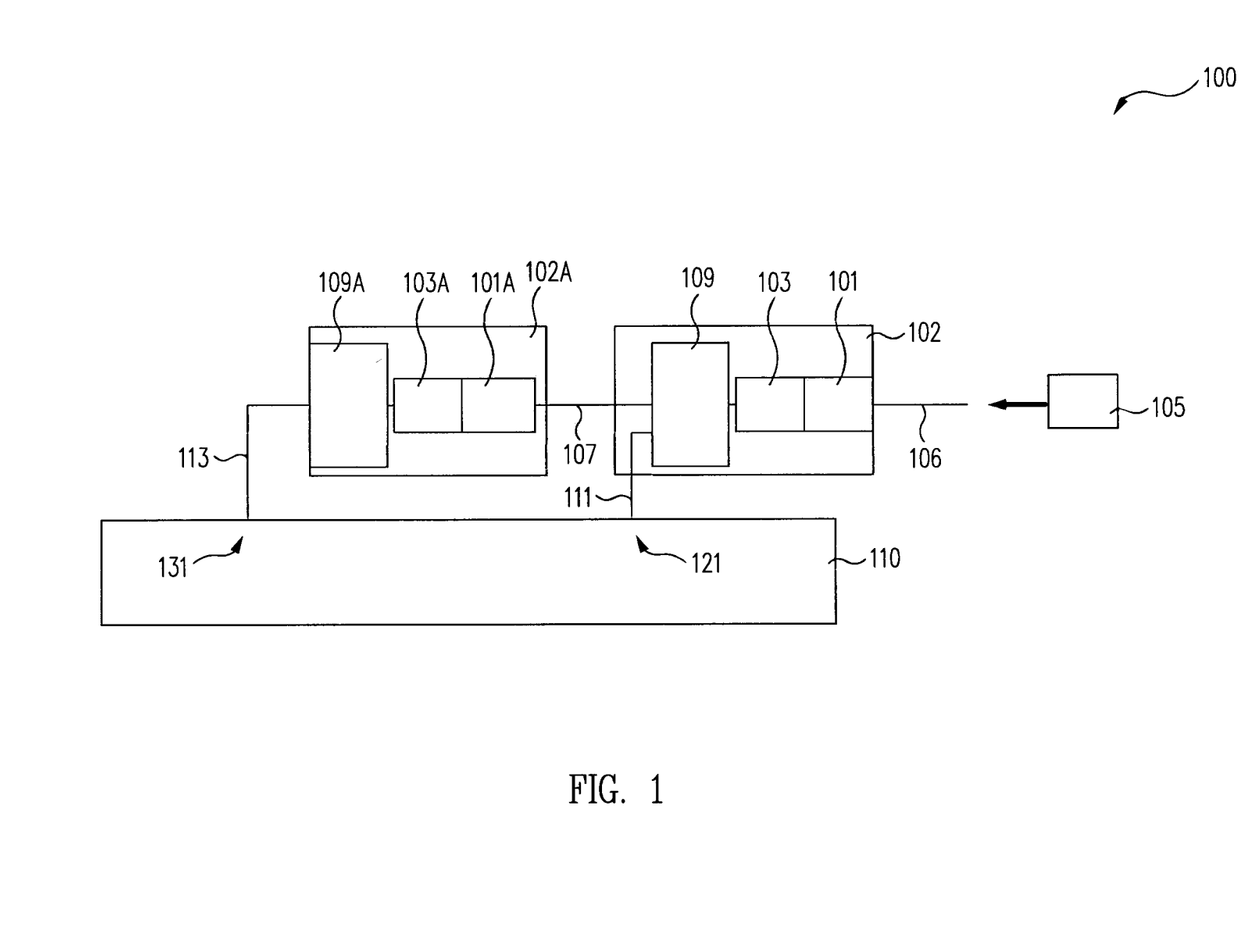
FIG. 1 illustrates an aircraft actuator system in accordance with an example of the disclosure.

FIG. 1 illustrates an aircraft actuator system 100 in accordance with an example of the disclosure. As shown in FIG. 1, aircraft actuator system 100 includes an actuator 102, a power drive unit 105, and a flap 110. Aircraft actuator system 100 may be used to control a deployment and retraction of flap 110. In some examples, flap 110 may be implemented as a trailing edge flap of an aircraft. In other examples, flap 110 is implemented as a leading edge flap. In another example, flap 110 is implemented as any control surface of an aircraft capable of being deployed and retracted. In various examples, actuator 102 is implemented to deploy and/or retract flap 110.

Actuator 102 receives a power input to drive flap 110 to a deployed position or a retracted position. In some examples, actuator 102 receives power input in the form of a rotary drive torque at an input shaft 106. Power drive unit 105 provides the rotary drive torque to deploy and retract flap 110. In some examples, power drive unit 105 is implemented as a motor to provide a power drive input to rotate input shaft 106. In other examples, power drive unit 105 is implemented as a hydraulic unit to provide power drive input to rotate input shaft 106. Other examples of power drive unit 105, such as a pneumatic unit, are possible in other implementations.

In various examples, actuator 102 includes a no-back brake 101, a torque brake 103, and an actuator gearing 109. No-back brake 101 is disposed within actuator 102. In some examples, no-back brake 101 is implemented as a bi-directional no-back brake. In this regard, no-back brake 101 is implemented to provide a braking force to input shaft 106 under conditions when input shaft 106 is not driven by power drive unit 105. In addition, no-back brake 101 provides a braking force to input shaft 106 in a direction that would result in movement of flap 110 in a direction of an applied aerodynamic force (e.g., an aiding force). Further, no-back brake 101 is released in a direction that would result in movement of flap 110 in a direction contrary to the applied aerodynamic force (e.g., an opposing force).

Torque brake 103 is disposed within actuator 102. In some examples, torque brake 103 is implemented to provide a torque limiting at output shaft 111. Torque brake 103 limits the torque at output shaft 111 to not exceed a maximum torque threshold of actuator 102 and/or flap 110.

Actuator gearing 109 is disposed within actuator 102 and is connected to input shaft 106 at a first end and connected to an output shaft 111 at a second end. Actuator gearing 109 is implemented with a high gear reduction to provide for efficient performance when deploying or retracting flap 110. In some examples, actuator gearing 109 provides for a one thousand four hundred to one gear reduction. In this regard, in some examples, actuator 102 is capable of driving the output shaft 111 at a rate of five hundred to six hundred revolutions per minute (rpm) and/or at one hundred twenty rpm. In some examples, output shaft 111 is connected to a drive linkage (e.g., not shown) that is connected to flap 110 used to drive flap 110.

In some examples, aircraft actuator system 100 includes a second actuator 102A that includes a second no-back brake 101A, a second torque brake 103A, and second actuator gearing 109A. Intermediate shaft 107 connects actuator gearing 109 to no-back brake 101. Output shaft 113 of second actuator 102A is connected to flap 110 to provide an output drive torque to flap 110. In some examples, actuator 102 is positioned at a first end 121 of flap 110 and second actuator 102A is positioned a second end 131 of flap 110. In this regard, actuator 102 and second actuator 102A generate sufficient drive torque to operate flap 110. In some examples, each actuator is sized such that either actuator 102 or second actuator 102A can deploy and/or retract flap 110.

Figure 2:
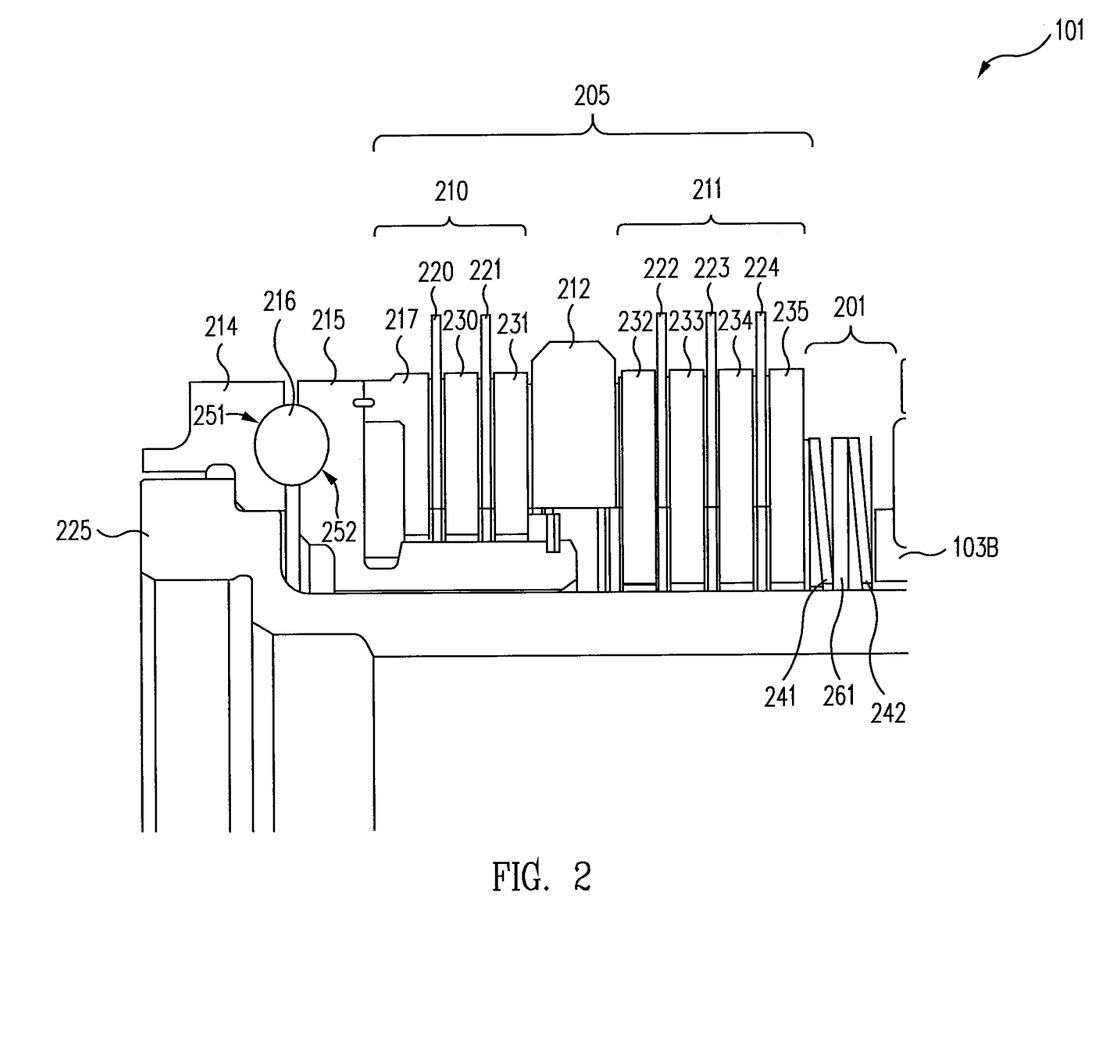
FIG. 2 illustrates a cross-section view of a no-back brake in accordance with an example of the disclosure.

FIG. 2 illustrates a cross-section view of a no-back brake 101 in accordance with an example of the disclosure. As illustrated, no-back brake 101 includes a modulating spring 201, a brake section 205, a reaction plate 214, and a ball ramp plate 215. As discussed herein, no-back brake 101 provides for braking input shaft 106 when no input power is applied, and maintains flap 110 in a commanded position. Further, no-back brake 101 provides for braking input shaft 106 during an aiding load operation.

Brake section 205 (e.g., brake) includes a drag brake section 210 and a main brake section 211. Drag brake section 210 provides for lower energy constant braking of input shaft 106. Drag brake section 210 includes a pressure plate 217, a stator 220, a stator 221, a rotor 230, and a rotor 231 arranged between ball ramp plate 215 and a spacer 212 on a shaft 225 of actuator 102. Stator 220 and stator 221 provide a ground path to an actuator housing in drag brake section 210. Main brake section 211 provides for high load braking of input shaft 106. Main brake section includes a stator 222, a stator 223, a stator 224, a rotor 232, a rotor 233, a rotor 234, and a rotor 235 arranged between spacer 212 and modulating spring 201 on shaft 225 of actuator 102. Stator 222, stator 223, and stator 224 provide a ground path to the actuator housing in main brake section 211.

As shown in FIG. 2, modulating spring 201 is coupled to brake section 205 (e.g., brake) on a first end and coupled to a structure 103B of torque brake 103 on a second end. Modulating spring 201 provides for damping of brake section 205 (e.g., brake) when brake section 205 is displaced to apply a braking action to input shaft 106 either during operations after the power drive unit has moved flap 110 in a commanded position or when a back dive air load is present during an aiding load operation. In some examples, modulating spring 201 includes a spring 241 (e.g., a first spring), a cylindrical washer 261 (e.g., a first cylindrical washer) oriented adjacent to spring 241, and a spring 242 (e.g., a second spring) oriented adjacent to the cylindrical washer 261. In this regard, modulating spring 201 is configured to progressively compress in response to the displacement of brake section 205.

In some examples, reaction plate 214 and ball ramp plate 215 are coupled to ball 216. For example, ball 216 is positioned within a cutout 251 (e.g., a first cutout) of reaction plate 214 and a cutout 252 (e.g., a second cutout) of ball ramp plate 215. The combination of reaction plate 214, ball 216, and ball ramp plate 215 axially displace brake section 205 during one or more of the modes of operation, as described herein.

Figure 3A:
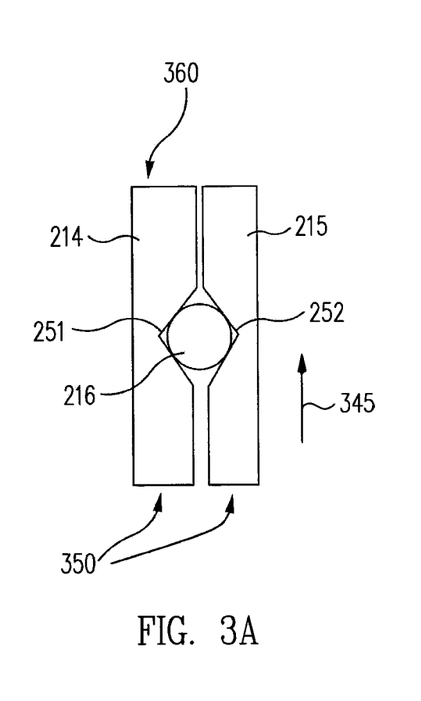
FIGS. 3A and 3B illustrate an air loading force applied at a no-back brake in accordance with examples of the disclosure.
Figure 3B:
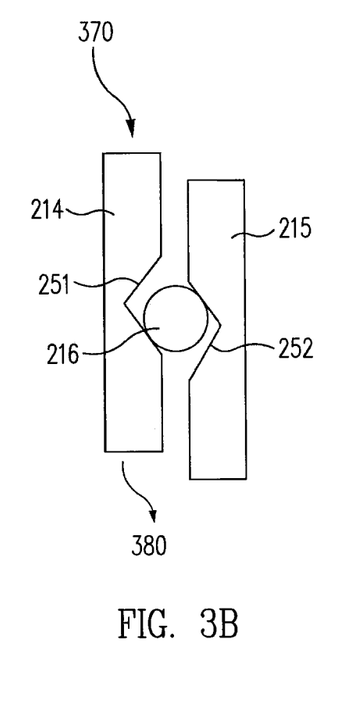

FIGS. 3A and 3B illustrate effects of air loading force applied at a no-back brake 101 in accordance with examples of the disclosure. FIG. 3A illustrates an opposing load example when power drive unit 105 is used to move flap 110 in a direction opposite an air load force. FIG. 3A shows an air load force 360 applied at ball ramp plate 215 and an input drive force 350, applied by power drive unit 105, in an opposite direction at reaction plate 214. Input drive force 350 at reaction plate 214 is equal to the air load force 360 and torque to slip drag brake section 210. In this regard, input drive force 350 aligns the reaction plate 214 and the ball ramp plate 215 such that ball 216 remains between cutout 251 and cutout 252. This results in no axial displacement of brake section 205 and modulating spring 201 is uncompressed.

FIG. 3B illustrates an aiding load example when power drive unit 105 is used to move flap 110 in a same direction of an air load force of flap 110. As illustrated, an aiding air loading force 380 and an input drive force 370 (e.g., as provided by power drive unit 105) are complementary forces on ball ramp plate 215 and reaction plate 214. Input drive force 370 displaces reaction plate 214 to unlock brake section 205 locked by aiding air loading force 380.

Modulating spring 201 compresses in response to brake section 205 being displaced, and modulating spring 201 applies a compressive force at brake section 205 corresponding to a distance that brake section 205 is displaced. Modulating spring 201 is implemented to provide a selective compressive force in response to brake section 205 displacement. For example, as brake section 205 is further axially displaced, modulating spring responsively increases a compressive force against brake section 205. As discussed herein, various implementations of modulating spring 201 provides for optimal performance under various types of aircraft actuator system 100 operating and loading conditions.

Figure 4A:
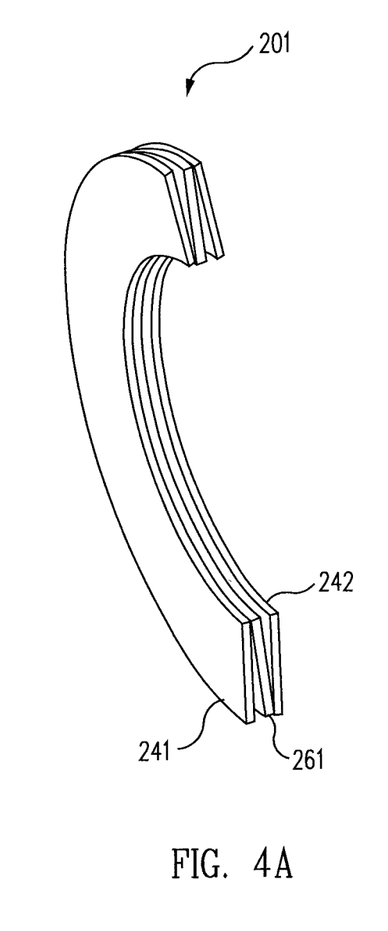
FIGS. 4A-4C illustrate various configurations of a modulating spring in accordance with examples of the disclosure.
Figure 4B:
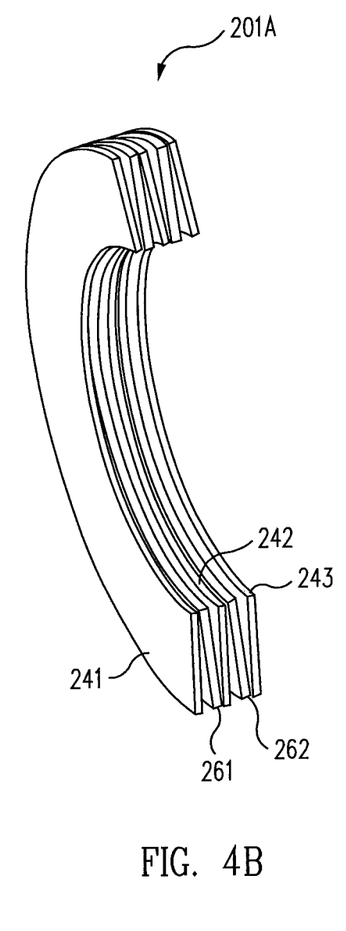
Figure 4C:
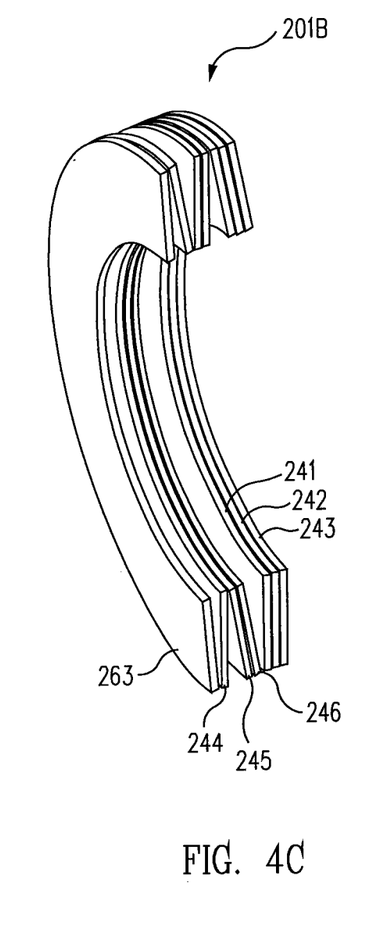

FIGS. 4A-4C illustrate various configurations of modulating spring 201 in accordance with examples of the disclosure. As illustrated in FIGS. 4A-4C, combinations of springs 241-246 and cylindrical washers 261-263 provide for various configurations of modulating spring 201. In this regard, modulating spring 201 can be tuned to easily compress in response to an initial displacement of ball ramp plate 215, and to compress less with further displacement, thereby selectively controlling the compressive force applied to brake section 205.

By utilizing a combination of springs 241-246 and cylindrical washers 261-263, an expected axial displacement can be achieved in response to one or more axial forces. In some examples, axial displacement is limited within no-back brake 101 due to space restrictions, and an expected compressive force of modulating spring 201 to reduce chatter is achieved by using combinations of springs 241-246 and cylindrical washers 261-263 within such space restrictions.

In some examples, cylindrical washers 261-263 are substantially flat cylindrical washers comprised of an alloy steel, a stainless steel, or an Inconel material. In other examples, cylindrical washers 261-263 may be a curved washer, a wave washer, or other suitably shaped washer. In some examples, springs 241-246 comprise a Belleville spring including a conical shape that provides an axial force (e.g., a compressive force) when deformed. In various examples, springs 241-246 are comprised of an alloy steel, a stainless steel, or an Inconel material.

Figure 5A:
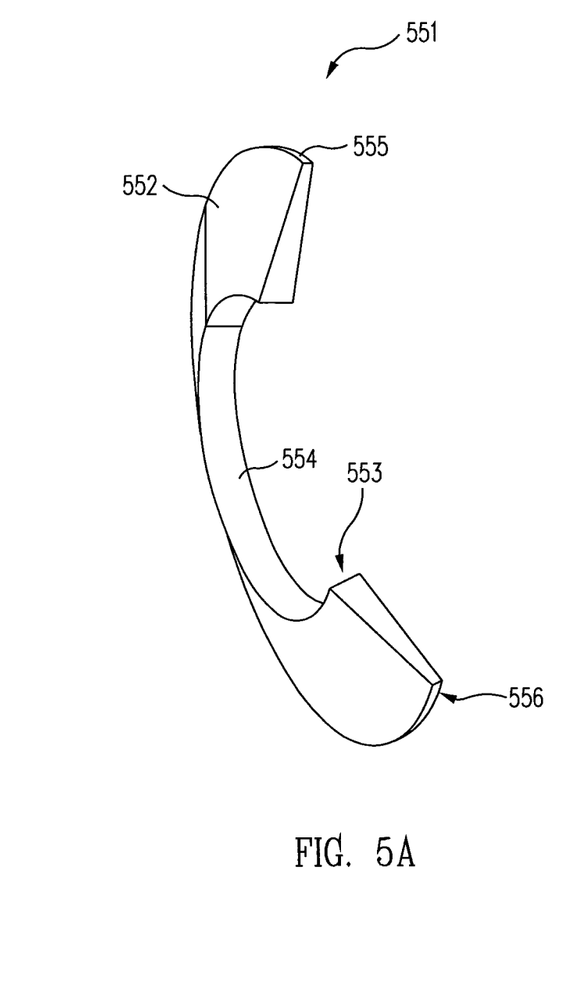
FIGS. 5A and 5B illustrate various spring configurations in accordance with examples of the disclosure.
Figure 5B:
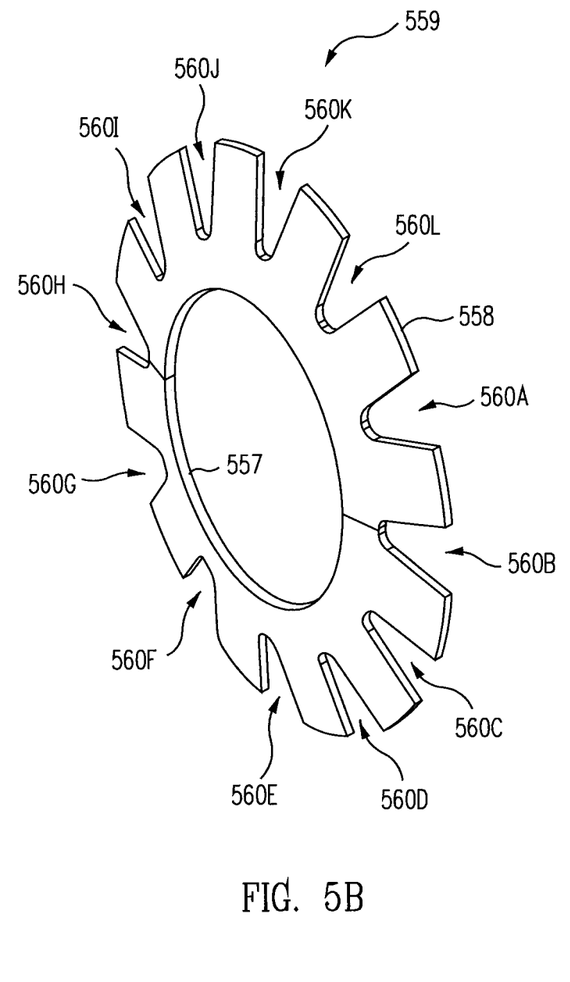

Referring to FIG. 5A, any one or more of springs 241-246 may be implemented as a tapered Belleville spring 551. Tapered Belleville spring 551 comprises a tapered surface 552, and a first thickness 553 at an inner diameter 554, and a second thickness 556 at an outer diameter 555. In some examples, first thickness 553 is at least greater than second thickness 556. In other examples, first thickness 553 is less than second thickness 556. Referring to FIG. 5B, any one or more of springs 241-246 may be a star belleville spring 559 implemented as a star spring with a plurality of cutouts 560A-560L that extend radially outward from an inner diameter 557 to an outer diameter 558 of star belleville spring 559.

FIG. 4A shows modulating spring 201 implemented as spring 241 (e.g., a first spring), cylindrical washer 261 (e.g., a first cylindrical washer) oriented adjacent to spring 241, and spring 242 (e.g., a second spring) oriented adjacent to cylindrical washer 261. The conical shape of spring 241 and spring 242 are arranged in a same orientation and facing brake section 205 to provide an axial force when deformed.

FIG. 4B shows modulating spring 201A implemented as spring 241, cylindrical washer 261 oriented adjacent to spring 241, and spring 242 (e.g., a second spring) oriented adjacent to cylindrical washer 261. In addition, modulating spring 201A includes cylindrical washer 262 (e.g., a second cylindrical washer) oriented adjacent to spring 242. Modulating spring 201A also includes a spring 243 (e.g., a third spring) oriented adjacent to cylindrical washer 262. Spring 241, spring 242, and spring 243 are arranged in a same orientation and facing brake section 205 to provide an axial force when deformed.

FIG. 4C shows modulating spring 201B implemented with a cylindrical washer 263 (e.g., a third cylindrical washer) oriented adjacent to spring 244 (e.g., a fourth spring). Spring 244 is oriented adjacent to spring 245 (e.g., a fifth spring) and spring 246 (e.g., a sixth spring). Spring 244 is arranged in an orientation with a conical shape that is facing brake section 205. Spring 245 and spring 246 are arranged in a same orientation with conical shapes that are facing opposite of spring 244. In addition, modulating spring 201B includes spring 241, spring 242, and spring 243 oriented adjacent to spring 246, and are arranged in a same orientation and facing brake section 205.

Figure 6:
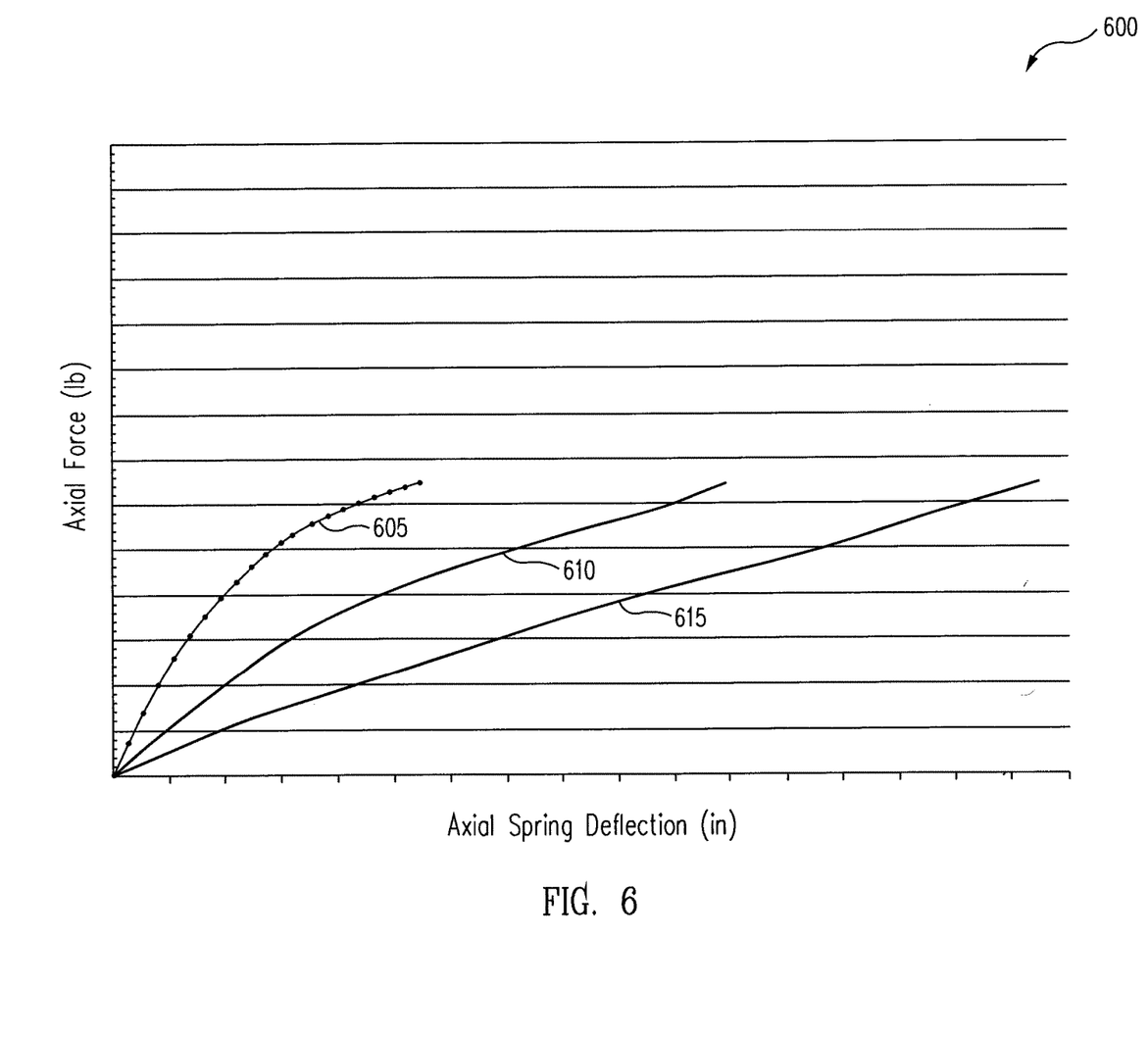
FIG. 6 illustrates a chart of spring displacement versus axial force in accordance with an example of the disclosure.

FIG. 6 illustrates a chart 600 of spring displacement versus axial force of modulating spring 201 in accordance with an example of the disclosure. As shown in FIG. 6, chart 600 includes an axial spring stack deflection (e.g., axial displacement of modulating spring 201) along the x-axis, and a corresponding axial force (e.g., resulting compressive force of modulating spring 201) along the y-axis. Chart 600 illustrates three curves. Curve 605 illustrates a response with a single spring implementation. Curve 605 shows a considerable increase in axial force in response to a small displacement, which may not provide optimal performance.

Curve 610 illustrates a response of modulating spring 201. Modulating spring 201 provides for an incremental increase in axial force for small displacements, and axial force progressively increases with increasing axial displacement. In this regard, modulating spring 201 can provide progressive damping of brake section 205 to reduce chatter, and provide optimal performance of no-back brake 101 during aiding load operations. Curve 615 illustrates a response of modulating spring 201A. As shown, modulating spring 201A provides further progressive damping of brake section 205 with increases in displacement to incrementally increase performance of no-back brake 101.

The gain of no-back brake 101 is related to the ability of no-back brake to prevent movement of flap 110 when not commanded. For example, a no-back brake with lower gain has a lower ability to hold flap 110. In this regard, a no-back brake 101 with high gain improves operational performance. A high gain also has a greater tendency to chatter during periods of aiding loading operations. Advantageously, modulating spring 201, with its progressive damping, provides for operation of no-back brake with high gain and reduced chatter.

Figure 7A:
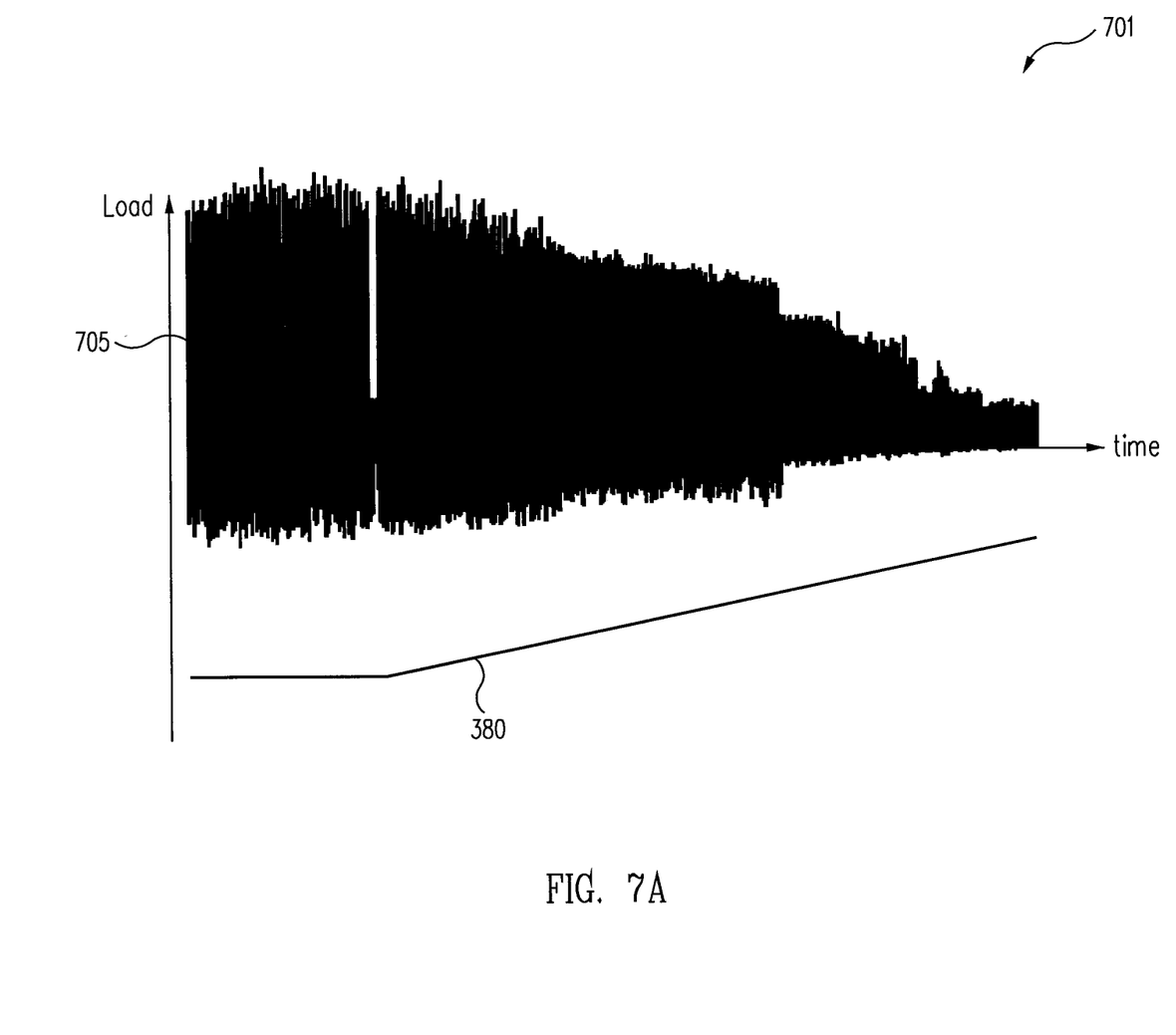
FIGS. 7A and 7B illustrate charts of no-back brake chatter in accordance with an example of the disclosure.

FIGS. 7A and 7B illustrate charts of no-back brake chatter in accordance with an example of the disclosure. Chart 701 of FIG. 7A illustrates a chatter response 705 of a no-back brake without modulating spring 201 responsive to an increasing aiding air loading force 380. As shown, chatter response 705 is severe during a period that aiding air loading force 380 is increasing. Chart 701 shows chatter response 705 has decreased (e.g., although insignificantly) after aiding air loading force 380 is at or near its maximum loading.

Figure 7B:
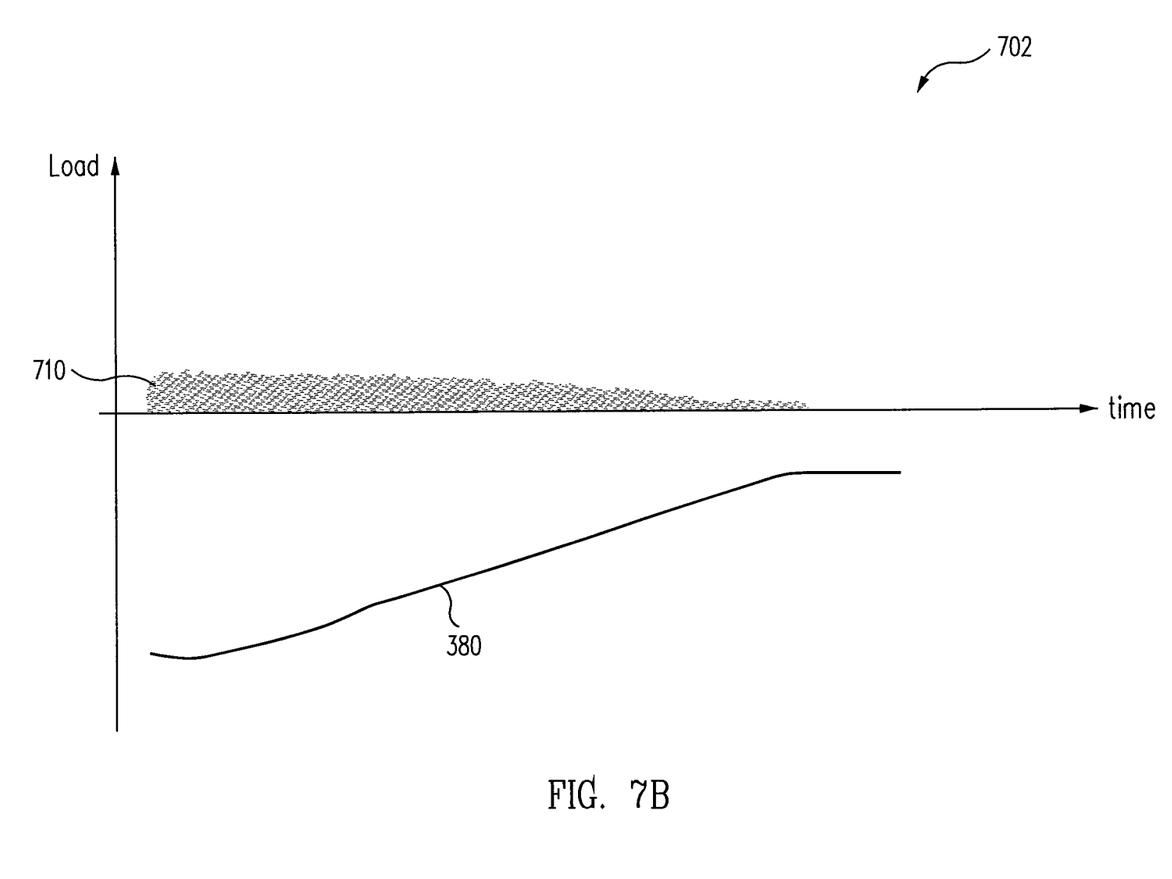

Chart 702 of FIG. 7B illustrates a chatter response 710 of no-back brake 101, including modulating spring 201, over time responsive to an increasing aiding air loading force 380. As shown, chatter response 710 is significantly reduced during the time that aiding air loading force 380 is increasing. Chart 702 shows chatter response 710 is negligible when aiding air loading force 380 is at its maximum loading. In this regard, modulating spring 201 provides advantages over other systems in reducing chatter while maintaining performance of no-back brake 101.

Figure 8:
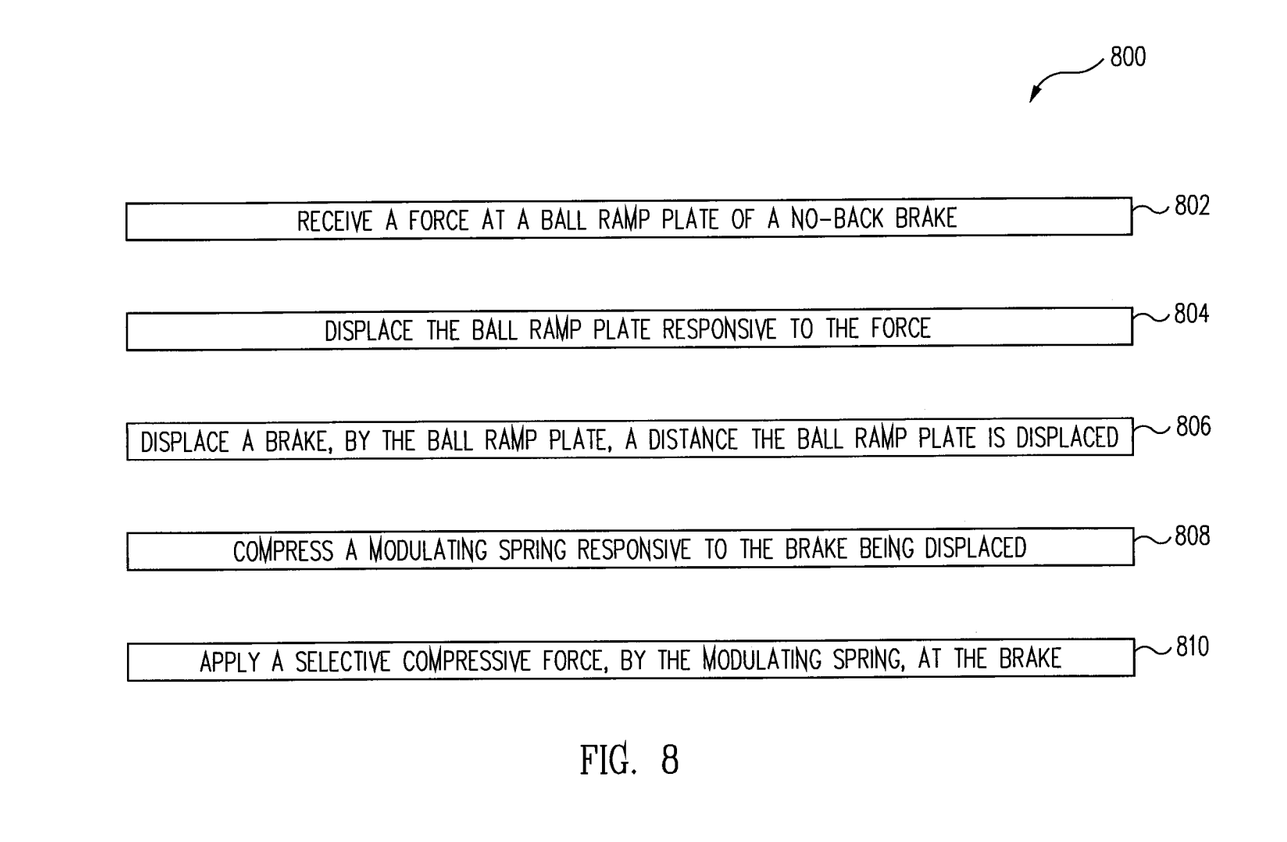
FIG. 8 illustrates a process of using an aircraft actuator system in accordance with an example of the disclosure.

FIG. 8 illustrates a process 800 of using an aircraft actuator system 100 in accordance with an example of the disclosure. The process may begin in block 802 by receiving a force comprising an air load associated with a flap 110 of an aircraft at a ball ramp plate 215 of a no-back brake 101. In some examples, a force (e.g., air load) is an aerodynamically induced air load corresponding to movement of flap 110 of the aircraft. In this regard, air load is an aiding air load force applying a torque on input shaft 106 in the same direction that power drive unit 105 is applying a torque on input shaft 106.

In block 804, process 800 continues by displacing the ball ramp plate 215 responsive to the force. In block 806, process 800 continues by displacing a brake section 205 (e.g., a brake), by the ball ramp plate 215, corresponding to a distance the ball ramp plate 215 is displaced.

In block 808, process 800 continues by compressing a modulating spring 201 responsive to the brake being displaced. In this regard, displacing ball ramp plate 215 by the force to move the brake section 205 of the no-back brake 101 compresses modulating spring 201. In some examples, modulating spring 201 includes a spring 241 (e.g., a first spring) and a spring 242 (e.g., a second spring). Spring 241 and spring 242 comprise a conical shape, and the conical shape of spring 241 and spring 242 are arranged in a same orientation facing the brake section 205 to provide a compressive force at brake section 205. In block 810, process 800 continues by applying a selective compressive force, by the modulating spring 201, at the brake section 205 corresponding to a distance the brake section 205 is displaced. Advantageously, modulating spring 201 reduces a chatter of the no-back brake 101 associated with movement of brake section 205 responsive to the force (e.g., the aerodynamically induced air load force).

In view of the present disclosure, it will be appreciated that an aircraft actuator system implemented in accordance with various examples set forth herein may provide for a reduction in chatter of the no-back brake during operational periods when an aiding air load force applies a torque on an input shaft an actuator in the same direction a power drive unit is applying a torque on the input shaft to control movement of a flap. The aircraft actuator system incorporates a modulating spring disposed within a no-back brake of the actuator. The modulating spring is implemented with multiple springs and cylindrical washers to effectively apply a progressive compressive force at a brake section of the no-back brake to reduce chatter during periods of aiding air load and high energy braking.

Where applicable, various examples provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Examples described above illustrate but do not limit the disclosure. It should also be understood that numerous modifications and variations are possible in accordance with the principles of the present disclosure. Accordingly, the scope of the disclosure is defined only by the following claims.

What is claimed is:

1. An apparatus comprising:
a no-back brake, disposed within an actuator coupled to an aircraft, comprising:
   a shaft;
   a ball ramp plate, coupled to the shaft, configured to receive a force comprising an air loading force and to be displaced responsive to the force;
   a brake, coupled to the shaft and coupled to the ball ramp plate, configured to be displaced, by the ball ramp plate, corresponding to a distance the ball ramp plate is displaced; and
   a modulating spring, coupled to the shaft and coupled to the brake, configured to compress in response to the brake being displaced, wherein the modulating spring is configured to apply a selective compressive force at the brake corresponding to a distance the brake is displaced, and wherein the modulating spring comprises:
      a first spring;
      a first cylindrical washer oriented adjacent to the first spring;
      a second spring oriented adjacent to the first cylindrical washer; and
      wherein the first spring and the second spring comprise a belleville spring.

2. The apparatus of claim 1, wherein the first spring and the second spring comprise a conical shape, wherein the conical shape of the first spring and the second spring are arranged in a same orientation facing the brake.

3. The apparatus of claim 1, wherein the belleville spring comprises a tapered surface, wherein the tapered surface comprises a first thickness at an inner diameter and a second thickness at an outer diameter, and wherein the first thickness is at least greater than the second thickness.

4. The apparatus of claim 1, wherein the belleville spring comprises a plurality of cutouts extending radially outward from an inner diameter to an outer diameter of the belleville spring.

5. The apparatus of claim 1, the modulating spring further comprises a second cylindrical washer oriented adjacent to the second spring, wherein the first cylindrical washer and the second cylindrical washer comprise a substantially flat cylindrical washer.

6. The apparatus of claim 5, further comprising a third spring oriented adjacent to the second cylindrical washer, wherein the third spring comprises a belleville spring, and wherein the first spring, the second spring, and the third spring are arranged in a same orientation facing the brake.

7. The apparatus of claim 6, wherein the first spring, the second spring, and the third spring comprise an alloy steel, a stainless steel, or an Inconel material.

8. The apparatus of claim 1, wherein the ball ramp plate is axially displaced by the force and configured to move the brake to compress the modulating spring.

9. The apparatus of claim 8, wherein the force comprises an aerodynamically induced air load corresponding to movement of a flap of the aircraft, and wherein the modulating spring reduces a chatter of the no-back brake associated with movement of the brake responsive to the force.

10. A method comprising:
receiving a force comprising an air load associated with a flap of an aircraft at a ball ramp plate of a no-back brake;
displacing the ball ramp plate responsive to the force;
displacing a brake, by the ball ramp plate, corresponding to a distance the ball ramp plate is displaced;
compressing a modulating spring responsive to the brake being displaced; and
applying a selective compressive force, by the modulating spring, at the brake corresponding to a distance the brake is displaced, and wherein the modulating spring comprises:
a first spring;
a first cylindrical washer oriented adjacent to the first spring;
a second spring oriented adjacent to the first cylindrical washer; and
wherein the first spring and the second spring comprise a belleville spring.

11. The method of claim 10, the method further comprising arranging a conical shape of the first spring and the second spring in a same orientation facing the brake.

12. The method of claim 10, wherein the belleville spring comprises a tapered surface, wherein the tapered surface comprises a first thickness at an inner diameter and a second thickness at an outer diameter, and wherein the first thickness is at least greater than the second thickness.

13. The method of claim 10, wherein the belleville spring comprises a plurality of cutouts extending radially outward from an inner diameter to an outer diameter of the belleville spring.

14. The method of claim 10, the modulating spring further comprises a second cylindrical washer oriented adjacent to the second spring, wherein the first cylindrical washer and the second cylindrical washer comprise a substantially flat cylindrical washer.

15. The method of claim 14, further comprising a third spring oriented adjacent to the second cylindrical washer, wherein the third spring comprises a belleville spring, the method further comprising arranging the first spring, the second spring, and the third spring in a same orientation facing the brake.

16. The method of claim 15, wherein the first spring, the second spring, and the third spring comprise an alloy steel, a stainless steel, or an Inconel material.

17. The method of claim 10, the method further comprising axially displacing the ball ramp plate by the force to move the brake to compress the modulating spring.

18. The method of claim 17, wherein the force comprises an aerodynamically induced load corresponding to movement of the flap of the aircraft, and wherein the modulating spring reduces a chatter of the no-back brake associated with movement of the brake responsive to the force.

* * * * *